United States Patent
Trafford et al.

(10) Patent No.: US 12,260,002 B2
(45) Date of Patent: Mar. 25, 2025

(54) PRIVACY PRESERVING APPLICATION PERSONALIZATION

(71) Applicant: American Express Travel Related Services Company, Inc., New York, NY (US)

(72) Inventors: Robert David James Trafford, Pease Pottage (GB); Fraser George Stewart, Burgess Hill (GB); Adrianus Johannes van der Meer, Brighton (GB)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 119 days.

(21) Appl. No.: 17/944,986

(22) Filed: Sep. 14, 2022

(65) Prior Publication Data

US 2024/0086574 A1 Mar. 14, 2024

(51) Int. Cl.
*G06F 21/62* (2013.01)
*G06F 21/31* (2013.01)
*G06Q 30/0201* (2023.01)

(52) U.S. Cl.
CPC .......... *G06F 21/6254* (2013.01); *G06F 21/31* (2013.01); *G06Q 30/0201* (2013.01)

(58) Field of Classification Search
CPC .. G06F 21/31; G06F 21/6254; G06Q 30/0201
See application file for complete search history.

(56) References Cited

U.S. PATENT DOCUMENTS

| | | | | |
|---|---|---|---|---|
| 2014/0089049 | A1* | 3/2014 | Cristofaro .......... | G06Q 30/0203 705/7.32 |
| 2014/0115715 | A1* | 4/2014 | Pasdar .................... | G06F 21/85 726/26 |
| 2015/0242374 | A1* | 8/2015 | Kong .................... | G06F 40/106 715/201 |
| 2020/0382455 | A1* | 12/2020 | Fasoli ................... | H04L 51/214 |

* cited by examiner

*Primary Examiner* — Gil H. Lee
(74) *Attorney, Agent, or Firm* — Thomas Horstemeyer, LLP

(57) ABSTRACT

Disclosed are various approaches for providing personalized recommendations in a privacy preserving manner. A request from a provider application is received, the request comprising an anonymized user identifier and a navigation identifier that identifies a location of a user associated with the anonymized user identifier within a user interface of the provider application. A user associated with the anonymized user identifier is identified. Then, an activity history of the user is analyzed in order to select a layout order, wherein the layout order is selected based at least in part on the navigation identifier and the activity history of the user. The layout order is then provided to the provider application.

12 Claims, 3 Drawing Sheets

PRIVACY PRESERVING APPLICATION PERSONALIZATION

BACKGROUND

Electronic commerce applications often provide personalized recommendations or suggestions for users in order to increase sales and to provide for a more enriching customer experience. Customers are not only willing to spend more on goods or services that are personalized to their tastes or preferences, but are also generally more satisfied with the experience. In order to provide these personalized recommendations, electronic commerce applications often will obtain personal data of customers through a variety of mechanisms. For example, electronic commerce applications may track user interactions and transactions to build a customer profile that can be used for future recommendations. As another example, electronic commerce applications can acquire data from third-party data brokers, which can be used to provide personalized recommendations.

These extensive data collection practices often raise a number of privacy and security concerns. For example, customers may wish to limit who has access to their personal data in order to preserve their privacy as unscrupulous parties may resell customer data without permission or use customer data in ways that the customers did not anticipate or would not have approved. As another example, data breaches can lead to customer data falling into the hands of criminals, where the customer data can be used to commit fraud or theft due to the criminals using customer data to impersonate the customers.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for providing personalized recommendations in a privacy preserving manner. A user can authenticate with an authentication service provided by a first party that has access to customer data (e.g., a bank, credit or charge card issuer, or other payment service). The first party can issue a unique anonymized user identifier, which the user can use to anonymously or pseudonymously identify themselves with a third-party website for purchasing goods or services (e.g., a travel provider website). Each time the third-party website receives a request containing the unique anonymized user identifier, the third-party website can send a request to the first party containing both the anonymized user identifier and the context of the user's request (e.g., which webpage or subpage they are visiting, what types of inventory they are searching, etc.). The first party can then access the user's data and provide one or more recommendations to the third-party service regarding the types of search results to provide the user and/or how to order or present the search results to the user. Because only the recommendations are provided to the third-party, but not the user data or the reasoning that the recommendations were selected, the user's data is protected from the third-party. As a result, the security of the user's data is improved because fewer parties have access to the user's data, but the user is still able to benefit from personalized content that is based at least in part on inferences that could be derived from the user's data.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
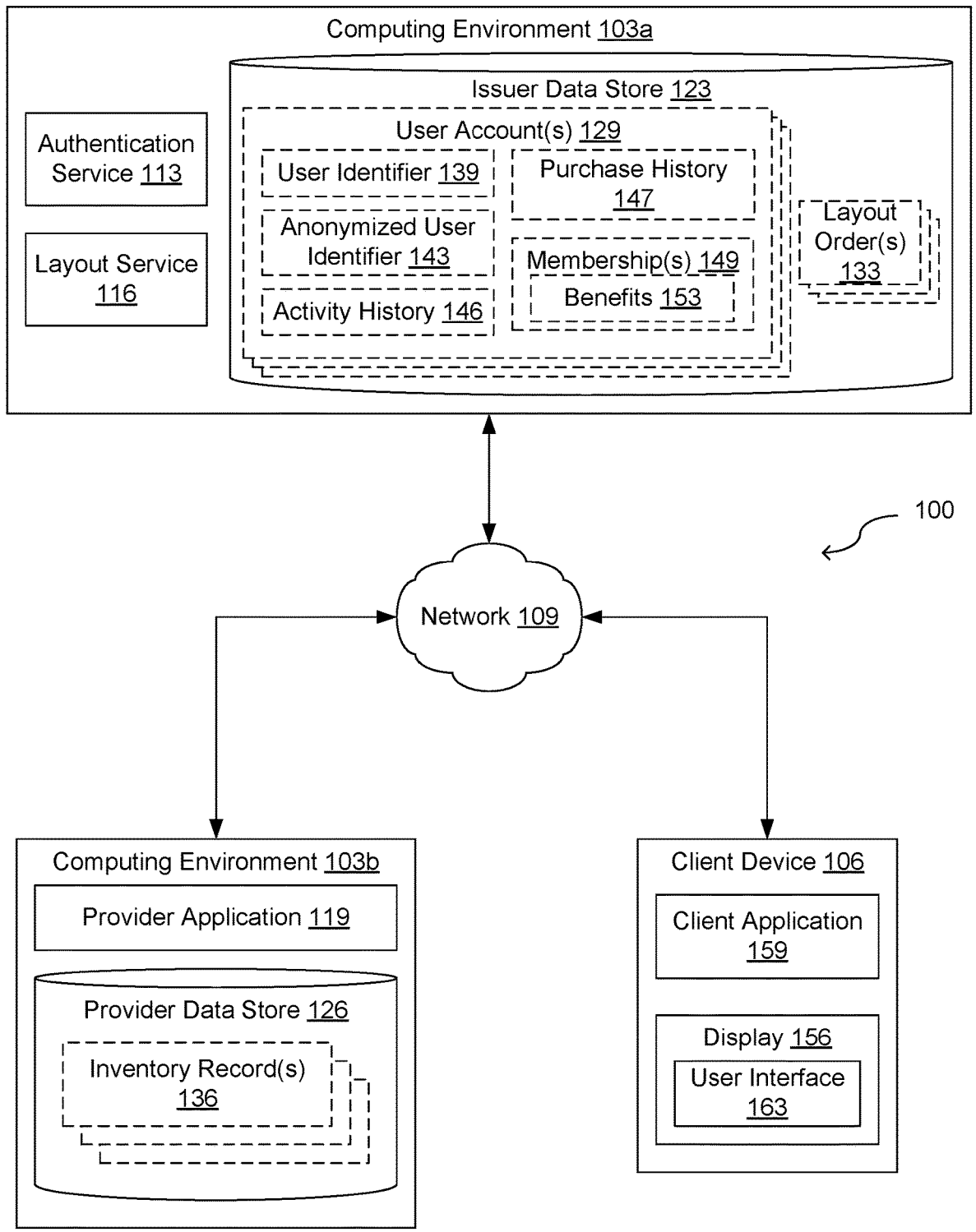
FIG. 1 is a drawing of a network environment according to various embodiments of the present disclosure.

FIG. 1 depicts a network environment 100 according to various embodiments. The network environment 100 can include one or more computing environments 103 (e.g., computing environment 103a and computing environment 103b), one or more client devices 106, and potentially other computing devices. The computing environments 103 and the client devices 106 can be in data communication with each other via a network 109.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

A computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, a computing environment 103 can employ a plurality of computing devices that can be arranged in one or more server banks or computer banks or other arrangements. Such computing devices can be located in a single installation or can be distributed among many different geographical locations. For example, a computing environment 103 can include a plurality of computing devices that together can include a hosted computing resource, a grid computing resource or any other distributed computing arrangement. In some cases, a computing environment 103 can correspond to an elastic computing resource where the allotted capacity of processing, network, storage, or other computing-related resources can vary over time.

Although two separate computing environments 103a and 103b are depicted for illustrative services, a single computing environment 103 could be used in various embodiments of the present disclosure. For example, multiple tenants could use resources of a single computing environment 103 provided by a cloud services provider, such as AMAZON WEB SERVICES® (AWS), MICROSOFT AZURE®, GOOGLE CLOUD COMPUTE®, etc.

Various applications or other functionality can be executed in the computing environments 103. For example, a credit card issuer could utilize the computing environment 103a to execute an authentication service 113 and a layout service 116, as well as potentially other applications or services. Meanwhile, an inventory provider (e.g., an online retailer, an online travel booking service, etc.) could utilize the computing environment 103b to execute a provider application 119 and potentially other applications or services.

Also, various data is stored in a data store that is accessible to a computing environment 103, such as the issuer data store 123 and the provider data store 126. A data store can be representative of a plurality of data stores, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store is associated with the operation of the various applications or functional entities described below. For example, the issuer data store 123 can store data such as individual user accounts 129 and individual layout orders 133. Meanwhile, the provider data store 126 can store data such as one or more inventor records 136

A user account 129 can represent information associated with a customer of a credit or charge card issuer operating the layout service 116 who is also a user of the provider application 119. For example, an AMERICAN EXPRESS customer could have a user account 129, which could also be used by the customer for interacting with the provider application 119. Various data could be associated with the user account 129, such as a user identifier 139, an anonymized user identifier 143, an activity history 146, a purchase history 147, one or more memberships 149, and potentially other data.

The user identifier 139 can represent any identifier that can uniquely identify a user account 129 with respect to other user accounts 129. Examples of user identifiers 139 can include usernames, email addresses, globally unique identifiers (GUIDs) or universally unique identifiers (UUIDs) assigned to a user account 129, etc. In some implementations, a user account 129 can have multiple user identifiers 139.

The anonymized user identifier 143 represents any identifier that can uniquely identify a user account 129 with respect to other user accounts 129 in an anonymous or pseudonymous fashion. The anonymized user identifier 143 could, therefore, be viewed as an alias for the user identifier 139. Accordingly, an anonymized user identifier 143 may make use of a user identifier that is not currently or has not been previously used to identify the user account 129. In some implementations, a user account 129 can have multiple anonymized user identifiers 143. For example, each time an anonymized user identifier 143 is needed or requested, the authentication service 113 could generate a new anonymized user identifier 143 in order to prevent third-parties from tracking activity associated with the anonymized user identifier 143 in order to deanonymize the user.

The activity history 146 can represent the history of a user's activity as recorded by the credit or charge card issuer. This can include one or more different types of activity. For example, the activity history 146 could include a history of a user's purchases using one or more credit or charge card accounts. Individual purchases in the activity history 146 could include the date and amount of the purchase, the merchant with whom the purchase was made, as well as an identification of individual goods or services purchased. The activity history 146 could also include information regarding rewards points redemptions (e.g., using points to make a purchase with a merchant or service provider, using points to obtain a statement credit, etc.).

In some implementations, the user account 129 can also include a purchase history 147, which could include purchase information related to purchases made with merchants or sellers using other payment instruments (e.g., cash, gift-cards, or credit or charge cards from other issuers). This additional purchase history 147 could include the date and amount of the purchase, the merchant with whom the purchase was made, as well as an identification of individual goods or services purchased. Data related to the purchase history 147 could be obtained from merchants on a regular basis using a variety of approaches.

The memberships 149 represent any loyalty or rewards programs that a user may be a member of. This could include merchant loyalty or rewards programs (e.g., airline frequent flyer programs, hotel loyalty programs, etc.) or credit or charge card benefit programs associated with a credit or charge card of the user. The benefits 153 represent benefits (e.g., discounts, free upgrades, etc.) associated with each membership 149.

The layout orders 133 represent recommendations for how inventory records 136 should be presented to the user. For example, vendor specific layout orders 133 could specify that a particular vendor's goods or services should be preferentially presented to the user. As another example, a layout order 133 could specify that a particular class of inventory should be preferentially presented to the user (e.g., first-class airline tickets, luxury hotel rooms, lowest cost items, etc.).

The inventory records 136 represent goods or services that can be purchased, leased, reserved, or otherwise booked using the provider application 119. Each inventory record 136 could represent a specific type of good or service that is available. For example, an inventory record 136 could represent a seat on a flight, a room at a hotel, a car rental reservation, a train ticket, a cabin on a cruise ship, or any other item or service. Accordingly, each inventory record 136 could include information about the item or service. An inventory record 136 for a flight could include the price of the flight, the date and time of departure, the date and time of arrival, the departure airport, the arrival airport, the airline making the flight, the class of the seat (e.g., first-class, economy-class, etc.), restrictions (e.g., non-refundable, non-transferable, etc.), and potentially other information. Similarly, an inventory record 136 for a train ticket could include the price, the origin and destination, date, time, train number, class (e.g., first-class, economy-class, etc.), restrictions (e.g., non-refundable, non-transferable, etc.), and potentially other information. As another example, an inventory record 136 for a hotel room include the price of the room, the date(s) the room is available, the type of room, the number of beds in the room, amenities of the room, amenities of the hotel, location of the hotel, rating of the hotel (e.g., one-star, two-star, three-star, four-star, five-star, value, mid-tier, luxury, etc.), and potentially other information. An inventory record 136 for a car reservation could include the type of car (e.g., make and model, compact sedan, mid-size sedan, SUV, minivan, etc.). Other types of inventory can have appropriate information stored in their records as well.

The authentication service 113 can be executed to authenticate a user on behalf of the provider application 119. In response to authentication, the authentication service 113 can issue a new anonymized user identifier 143, which can be used by the user to identify themselves to the provider application 119. Because an anonymized user identifier 143 is provided, the user's identity and information about the user can be hidden or obscured from the provider application 119 because the provider application 119 will be unable to map or associate the anonymized user identifier 143 to the user account 129 of the user.

The layout service 116 can be executed to determine how the provider application 119 should present inventory records 136 to a user. The layout service 116 can, for example, analyze the activity history 146, the purchase history 147, and/or memberships 149 to identify preferred vendors of the user (e.g., preferred airlines, preferred hotel chains, etc.), preferred inventory types of the user (e.g., prefers to book first-class tickets, prefers to stay in luxury hotels, etc.), or other user preferences and provide one or more layout orders 133 that reflect these user preferences. The layout service 116 could also select specific layout orders 133 based on other factors. For example, an airline could pay an advertising fee to have their offers listed preferentially, so a layout order 133 for that airline could be selected by the layout service 116. When conflicting layout orders 133 are selected (e.g., a layout order 133 for airline A based on a user's preference for airline A and a second layout order 133 for airline B based on a user's preference for direct flights), the layout order 133 can rank the layout orders 133 and provide the ranked layout orders 133 to the provider application 119.

The provider application 119 can be executed to provide users of a client device 106 with access to inventory, as reflected by inventory records 136, for purchase or lease. For example, the provider application 119 could correspond to a travel booking website or service that offers users the ability to search for and book flights, trains, cruises, hotel accommodations, car rentals, etc. As another example, the provider application 119 could represent an electronic commerce application or storefront that sells items, digital media, or other goods or services.

The client device 106 is representative of a plurality of client devices that can be coupled to the network 109. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 156, such as liquid crystal displays (LCDs), gas plasma-based flat panel displays, organic light emitting diode (OLED) displays, electrophoretic ink ("E-ink") displays, projectors, or other types of display devices. In some instances, the display 156 can be a component of the client device 106 or can be connected to the client device 106 through a wired or wireless connection.

The client device 106 can be configured to execute various applications such as a client application 159 or other applications. The client application 159 can be executed in a client device 106 to access network content served up by the provider application 119 or other applications or services, thereby rendering a user interface 163 on the display 156. To this end, the client application 159 can include a browser, a dedicated application, or other executable, and the user interface 163 can include a web page, an application screen, or other user mechanism for obtaining user input. The client device 106 can be configured to execute applications beyond the client application 159 such as email applications, social networking applications, word processors, spreadsheets, or other applications.

Next, a general description of the operation of the various components of the network environment 100 is provided. Although this general description provides one example of the interactions between the various components are included within the various embodiments of the present disclosure. Additional details about the operation of, or interactions between, the various components of the network environment 100 are provided in FIGS. 2 and 3.

To begin, a client application 159 can make a request of the provider application 119 for a web page. For example, the client application 159 could make a request for the web page for booking flights, or could make a first request for the home page associated with the provider application 119, and then navigate to a subpage that allows for booking flights.

At some point during the user journey, the user could authenticate himself or herself. For example, the user could authenticate himself or herself to get more personalized or more relevant listings of inventory (e.g., flights). Accordingly, the user could request to authenticate himself or herself (e.g., by entering a username and password). The authentication request could be relayed by the provider application 119 to the authentication service 113, which could authenticate the user. In response, the authentication service 113 could issue an anonymized user identifier 143 for the user.

As the user continues to interact with the provider application 119, the client application 159 can provide the anonymized user identifier 143 to the provider application 119. For example, when the client application 159 makes a subsequent request to the provider application 119 for a webpage listing flights or a webpage listing hotel bookings, the client application 159 could also provide the anonymized user identifier 143 to the provider application 119 with the request. The provider application 119 could then provide the anonymized user identifier 143, along with a navigation identifier representing the context of the request (e.g., the user is making a request for flights, the user is making a request for hotels, etc.), to the layout service 116.

The layout service 116 could then use the anonymized user identifier 143 to identify the user account 129 of the user. The layout service 116 could then analyze the activity history 146 of the user, the purchase history 147 of the user, the memberships 149 of the user, and/or other factors to select one or more layout orders 133 to provide to the provider application 119. If multiple layout orders 133 are selected, then the layout service 116 could rank the layout orders 133 and provide both the layout orders 133 and the ranking to the provider application 119.

The provider application 119 could then use the layout orders 133 to organize how inventory records 136 for inventory are presented within the user interface 163 presented on the display of the client device 106. For example, the provider application 119 could select only those inventory records 136 (e.g., flights) which match the user's preferences identified in the layout orders 133 (e.g., display only economy-class tickets on direct flights or flights for a specific airline). They could also be displayed in order according to the rankings of the layout orders 133. For example, if the layout order 133 for directly flights were ranked higher than the layout order 133 for flights on the preferred airline, inventory records 136 for direct flights on the preferred airline could be presented first, followed by direct flights on other airlines, follows by flights on the preferred airline.

Figure 2:
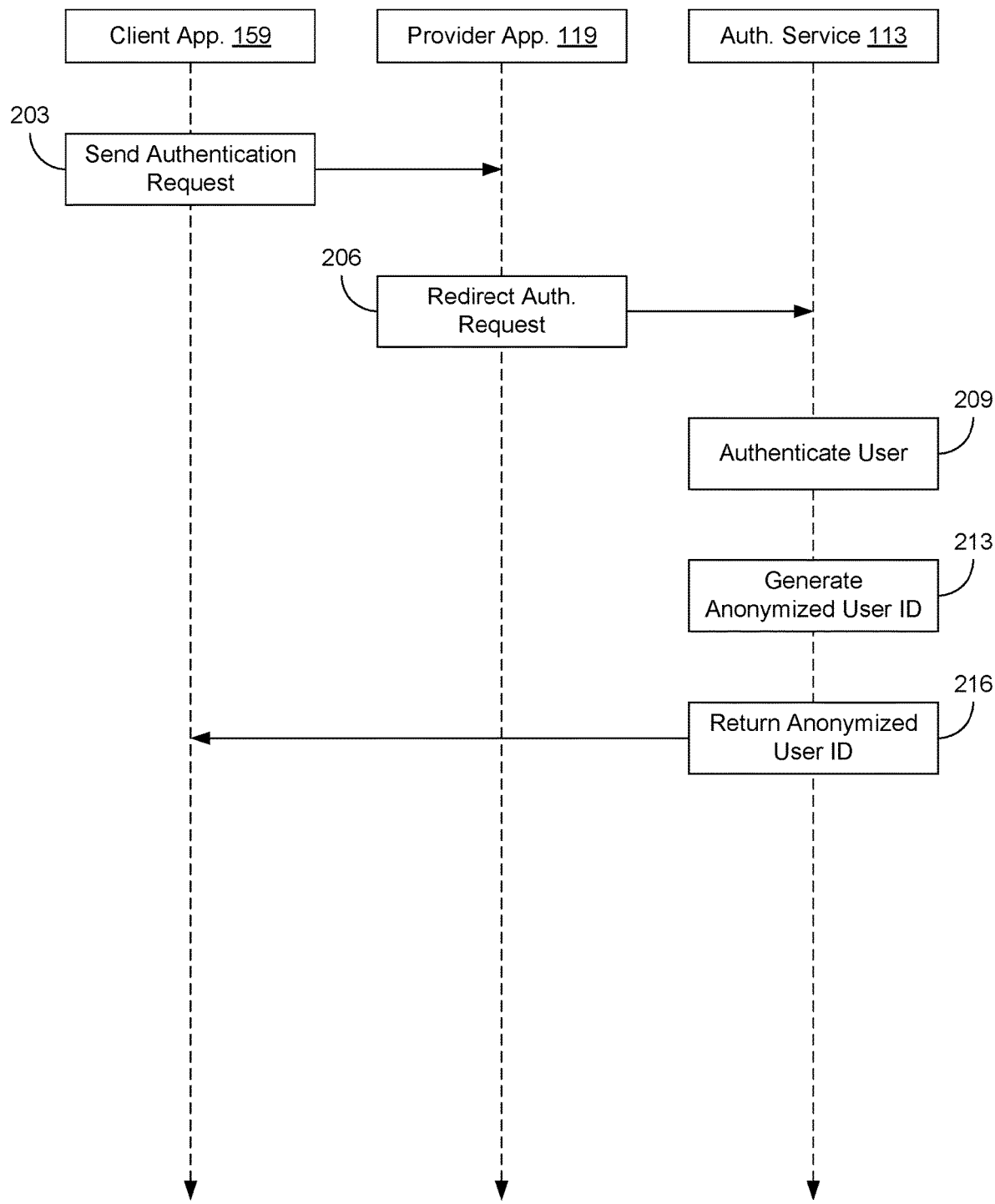
FIG. 2 is a sequence diagram illustrating the interactions between the various components of the network environment of FIG. 1 according to various embodiments of the present disclosure.

Referring next to FIG. 2, shown is a sequence diagram that provides one example of the interactions between the client application 159, provider application 119, and the authentication service 113. The sequence diagram of FIG. 2 provides merely an example of the many different types of functional arrangements that can be employed by the client application 159, provider application 119, and the authentication service 113. As an alternative, the sequence diagram of FIG. 2 can be viewed as depicting an example of elements of a method implemented within the network environment 100.

Beginning with block 203, the client application 159 can send a request to the provider application 119 to authenticate the user of the client application 159. For example, when a user selects a "login" or "sign in" hyperlink on a webpage presented by the provider application 119, the client application 159 could send a request for the login, sign in, or authentication interface, such as a web page, used by the provider application 119.

At block 206, the provider application 119 can cause the authentication request to be redirected to the authentication service 113. For example, the provider application 119 could direct the client application 159 to a login, sign in, or authentication interface provided by the authentication service 113. When the client application 159 submits authentication credentials for the user (e.g., a user identifier 139 such as a username and an authentication credential such as a password), they are sent from the client application 159 to the authentication service 113.

At block 209, the authentication service 113 could then authenticate the user. For example, the authentication service 113 could determine that the user identifier 139 provided by the client application 139 matches the user identifier 139 of a user account 129 and that the authentication credentials provided by the client application 159 are valid.

In response to authenticating the user, the authentication service 113 could generate an anonymized user identifier 143 at block 213. For example, the authentication service 113 could generate a random value for use as an authentication token (e.g., by generating a new globally unique identifier (GUID) or universally unique identifier (UUID)). The authentication service 113 could further confirm that the anonymized user identifier 143 has not been previously issued for the user account 129 or another user account 129 in order to preserve the privacy of the user for future interactions with the provider application 119.

Subsequently, at block 216, the authentication service 113 can return the anonymized user identifier 143 to the client application 159. The client application 159 can then use the anonymized user identifier 143 in future interactions with the provider application 119, as described later.

Figure 3:
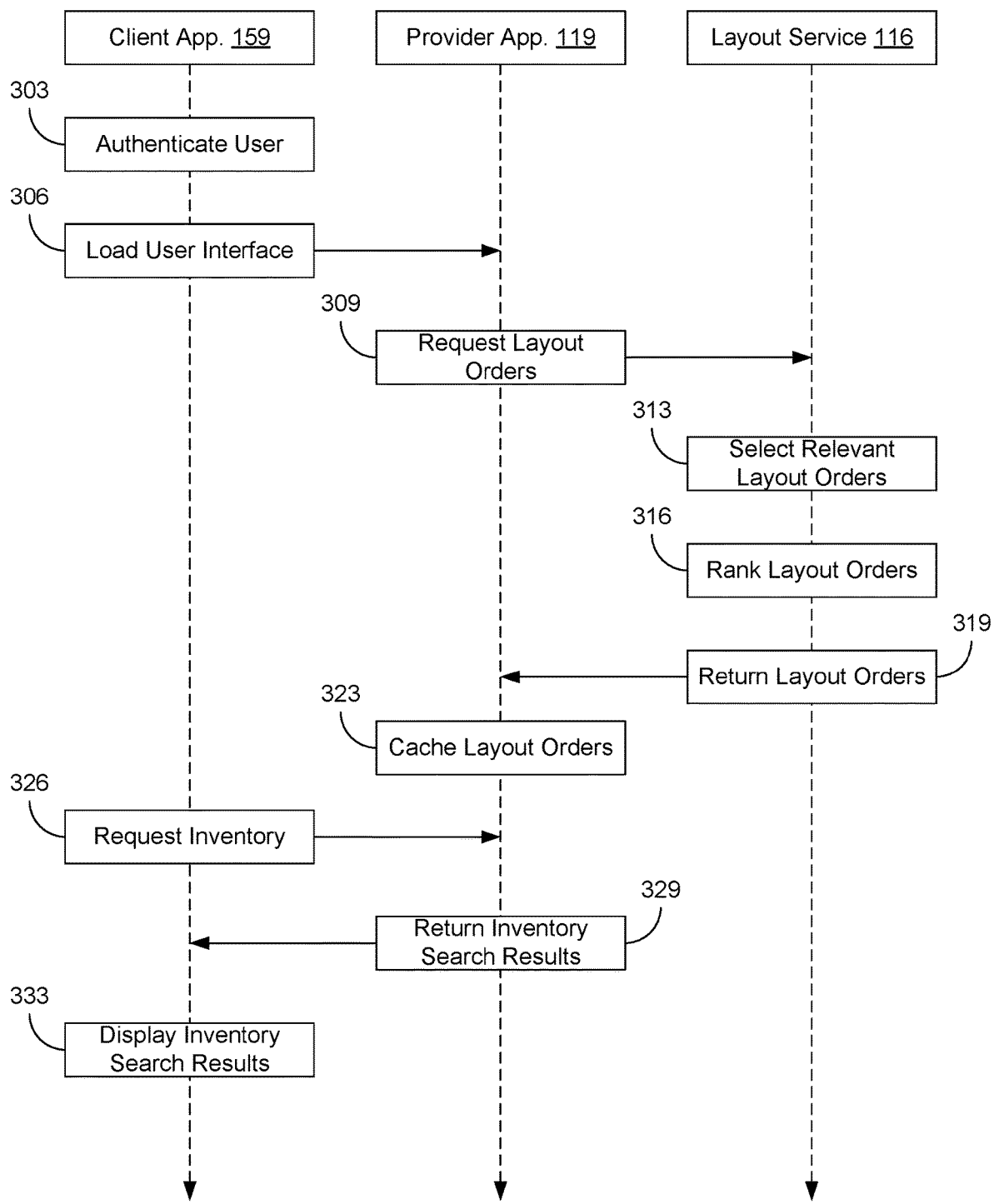
FIG. 3 is a sequence diagram illustrating the interactions between the various components of the network environment of FIG. 1 according to various embodiments of the present disclosure.

Referring next to FIG. 3, shown is a sequence diagram that provides one example of the interactions between the client application 159, provider application 119, and the layout service 116. The sequence diagram of FIG. 3 provides merely an example of the many different types of functional arrangements that can be employed by the client application 159, provider application 119, and the layout service 116. As an alternative, the sequence diagram of FIG. 3 can be viewed as depicting an example of elements of a method implemented within the network environment 100.

Beginning with block 303, the client application 159 can authenticate the user with the authentication service 113 to obtain an anonymized user identifier 143. The process for obtaining the anonymized user identifier 143 has been previously described in FIG. 2.

Then, at block 306, the client application 159 can send a request to the provider application 119 for to load a specified user interface. For example, if the client application 159 were a web browser, it could send a request to the provider application 119 for a specified web page (e.g., a home page, a flight search page, a hotel search page, a vacation package planning page, etc.). If the client application 159 were a dedicated or native application (e.g., a mobile application installed on a smartphone, tablet, or other mobile device), it could load a screen and send a notification to the provider application 119 identifying which screen was loaded. The request can also include the anonymized user identifier 143 of the user of the client application 159 so that the provider application 119 can provide personalized results to the user.

In response to the client application 159 loading the user interface 163 (e.g., web page, mobile application UI, etc.), the provider application 119 can send a request to the layout service 116 for one or more relevant layout orders. The request can include the anonymized user identifier 143 and a navigation identifier. The anonymized user identifier 143 can be sent so that layout service 116 can select appropriate layout orders 133 to assist the provider application 119 in providing personalized results for the user. The navigation identifier, which identifies the user's location within the user interface (e.g., which webpage the user has loaded, which application screen the user is currently interacting with, etc.), is provided to the layout service 116 so that the layout service 116 can select relevant layout orders 133.

Accordingly, at block 313, the layout service 116 can select relevant layout orders 133 for the provider application 119. The selection can be based at least in part on the anonymized user identifier 143 and the navigation identifier, as well as other potential criteria. A number of examples as to how the layout service 116 could select one or more layout orders 133 are provided below. Although described separately, any or all of these examples can be used alone or in combination with any of the other examples. Other approaches than those described may also be used by the various embodiments of the present disclosure.

First, the layout service 116 could limit or exclude the selection of layout orders 133 to those that are related to or match the navigation identifier provided by the provider application 119. For example, if the navigation identifier indicates that the user has requested a webpage for searching and booking flights, the layout service 116 could limit the layout orders 133 to be selected to those related to flights. Similarly, if the navigation identifier indicates that the user has requested a webpage for searching and booking hotel rooms, the layout service 116 service 116 could limit the layout orders 133 to be selected to hose related to hotel stays.

The layout service 116 could then analyze the activity history 146 and/or the purchase history 147 of the user account 129 of the user in order to select one or more relevant layout orders 133. For example, the layout service 116 could analyze the activity history 146 and/or the purchase history 147 to identify purchases or reward redemptions for items that are related to the navigation identifier. For instance, if the navigation identifier indicated that the user was viewing a web page for searching for flights to book, the layout service 116 could analyze the activity history 146 and/or the purchase history 147 to identify purchases of or reward redemptions for flights. As a similar example, if the navigation identifier indicated that the user was viewing a web page for searching for hotels to book, the layout service 116 could analyze the activity history 146 and/or the purchase history 147 to identify purchases of or reward redemptions for hotels. Similar approaches for other types of goods or services could be used.

Once the appropriate purchases or reward redemptions are identified, then the layout service 116 could use various machine learning techniques to identify patterns that could be representative of customer preferences. For example, the layout service 116 could use machine learning to determine that the user prefers a certain airline and also prefers direct flights, but frequently chooses a direct flight from another airline if there are no direct flights from his or her preferred airline. As another example, the layout service 116 could use machine learning to determine that the user generally books first-class tickets, if available, or that the user appears to book the cheapest fare possible (e.g., economy class). The layout service 116 could also use machine learning to determine that the user prefers to depart within a preferred time window (e.g., early morning). As a result, the layout service 116 could select layout orders 133 specifying the preferred airline of the user, the preferred fare type or price of the user, the preferred departure time of the user, and that the user prefers to book direct flights. Similar machine learning approaches could used for other types of goods or services, such as selecting hotel purchases and using machine learning to determine the user's preferred hotel type (e.g., budget, value, mid-tier, luxury), hotel brand, room type (e.g., standard, deluxe, suite, etc.), preferred price range, etc.

The layout service 116 could use also machine learning to identify correlated preferences in order to select additional layout orders 133. For example, the layout service 116 could use machine learning to determine that there is a correlation between two types of purchases. For example, machine learning could reveal that a user frequently rents a car when he or she purchases a flight. Therefore, the layout service could analyze the activity history 146 and/or the purchase history 147 of the user to select one or more layout order 133 for car rentals, as well as a layout order 133 indicating that a car rental should be included in conjunction with flight options.

These correlations could also be used to identify other types of inventory a user might be interested in purchasing. For example, correlated preferences could be identified that indicate that a user who is likely to spend large sums of money in one area is also likely to spend large sums of money in other areas. Therefore, the layout service 116, when presented with a new type of inventory or inventory record 136 from the provider application 119, could select a layout order 133 that preferences higher priced items. As a similar example, correlated preferences could be identified that indicated that a user who makes luxury purchases in one area is likely to make luxury purchases in other areas (e.g., someone who flies first class is also likely to stay in a five-star hotel or eat a Michelin-starred restaurant). Therefore, the layout service 116, when presented with new type of inventory record 136 from the provider application 119, could select a layout order 133 that preferences "luxury" inventory.

The machine learning techniques could also be used to track or identify changes over time in the purchase preferences of a user. For example, as the activity history 146 and/or the purchase history 147 of a user grows, the layout service 116 could use machine learning to identify changes in user preferences based on previous purchases. As another example, the provider application 119 could provide feedback to the layout service 116 to indicate whether the inventory what was preferenced in a layout order 133 was selected by the user. For example, if the layout order 133 for flights indicated that flights from one airline should be presented first, but the user selected a flight from a second airline, the provider application 119 could provide this information to the layout service 116 in order to continuously train the machine learning models used by the layout service 116.

The layout service 116 could also analyze the memberships 149 associated with the user account 129 to select one or more relevant layout orders 133. For example, a user's membership in a merchant rewards or loyalty program can be an indicator that the user prefers to interact with that company. If the user is a member of an airline frequent flyer program, then a layout order 133 for that airline could be selected when the navigation identifier indicates that the user is searching for or booking a flight. Similarly, if the user is a member of a hotel rewards program, then a layout order 133 for that hotel brand or chain could be selected when the navigation identifier indicates that the user is searching for a hotel to book.

The layout service 116 could also use other criteria for selecting relevant layout orders 133. For example, some merchants could pay an advertising or promotional fee to have their listings promoted over others. For example, an airline opening a new hub or a new route may pay to promote flights to or from the new hub or on the new route. As another example, merchants may be running promotions, such as a hotel offering a promotion where a user can stay two nights, and get a third night free. Accordingly, if the navigation identifier indicates that the user is booking flights, the layout order 133 for the airline's new hub or route may be selected. Similarly, if the navigation identifier indicates that the user is booking hotel rooms, the layout order 133 for the hotel that is running the promotion could be selected.

Proceeding to block 316, the layout service 116 can rank the layout orders 133 selected at block 313. This could be done according to one or more predefined rules. For example, a rule could state that layout orders 133 selected based on the activity history 146 and/or the purchase history 147 of the user be ranked higher than layout orders 133 selected based on the memberships 149 of the user. Other rules could be used according to specific implementations. As another example, machine learning approaches could be used to rank the selected layout orders 133. For example, machine learning could determine that direct flights are more important to a user than the airline, which is more important than the price of the flight. Therefore, a layout order 133 indicating a preference for direct flights could be ranked higher than a layout order 133 specifying a particular airline, which would be ranked higher than a layout order 133 indicating a minimum or maximum fare price.

Next, at block 319, the layout service 116 can return the selected layout orders 133. In some instances, the layout orders 133 could be returned in ranked order. In other instances, the rankings of the layout orders 133 could be returned together with the layout orders 133. In those implementations where the layout orders 133 were not ranked, then no ranking would be returned. Because the layout orders 133 are returned, but no reason as to why particular layout orders 133 were selected is provided, the provider application 119 is unable to learn anything about the user. For example, the provider application 119 would not know why a layout order 133 specifying a particular airline was returned by the layout service 116. Instead, the provider application 119 would only know it is supposed to surface flights for a particular airline to the user. Moreover, because the user has submitted and anonymized user identifier 143, the provider application 119 will not know the identity of the user selecting the flights.

Then, at block 323, the provider application 119 can cache the layout orders 133 received at block 319 in association with the anonymized user identifier 143. This can be done so that if the user submits a search query or request for inventory records (e.g., searches for flights, hotels, car rentals, vacation packages, or other goods or services), the provider application 119 will know how to personalize the results for the user.

At block 326, the client application 156 can send a search request to the provider application 119 to see available inventory. The request can include the anonymized user identifier 143 so that the provider application 119 can provide personalized results without knowing the identity of the user of the client application 159. The request can also specify search parameters for the inventory. For example, the request could specify that the user is searching for flights on a particular date or range of dates between specified cities or airports. This request, for example, could come from the client application viewing a flight search page of the provider application 119 and sending a request with the specified criteria. As another example, the request could specify that the is searching for a hotel room in a given city for a specified number of nights beginning on a specified date. This request, for example, could come from the client application viewing a hotel search page of the provider application 119 and sending a request with the specified criteria.

In response, at block 329, the provider application 119 can search for inventory records 136 that match the search request received at block 326. For example, if a user submitted a search for all flights between two cities within a certain date range, the provider application 119 can then search for inventory records 136 for flights matching the request. The provider application 119 could then use the anonymized user identifier 143 provided at block 326 to search for any layout orders 133 that were cached at block 323. The provider application 119 could then use the cached layout orders 133 to personalize the order in which inventory records 136 are presented to the user. For example, if a highest ranked layout order 133 specified a preference for direct flights and a second highest ranked layout order 133 specified a preference for a particular airline, then the provider application 119 could order the inventory records 136 for the matching flights so that direct flights from the preferred airline are listed first, direct flights from other airlines are listed second, flights with connections from the preferred airline are listed third, and all other flights are listed last. As another example, if a layout order 133 indicates that offers for car rentals should be provided whenever a user is searching for a flight, then offers for car rentals could be placed within the search results for flights. Similar approaches could be used for ranking other items or services that a user might search for (e.g., hotel rooms, car rentals, train tickets, etc.). Additional layout orders 133 could also impact how inventory records 136 are ordered, with more layout orders 133 that the provider application 119 identifies as applicable resulting in more fine-grained sorting and ordering of the inventory records 136 in the search results. Once the provider application 119 sorts and orders the inventory records 136 in the manner specified by the layout orders 133, the sorted and ordered inventory records 136 can be returned to the client application 159.

Finally, at block 333, the client application 159 can display the inventory records 136 provided as search results. Moreover, the search results will be displayed in compliance with the layout order(s) 133 received at block 319 and cached at block 323. As a result, the user will see within the user interface 163 a highly personalized selection of inventory records 136 without the provider application 119 receiving any personal data about the user.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
    a computing device comprising a processor and a memory; and
    machine-readable instructions stored in the memory that, when executed by the processor, cause the computing device to at least:
        receive a request from a provider application, the request comprising an anonymized user identifier and a navigation identifier that identifies a location of a user associated with the anonymized user identifier within a user interface of the provider application;
        identify the user associated with the anonymized user identifier;
        analyze an activity history of the user to select a first layout order, wherein the layout order is selected based at least in part on the navigation identifier and the activity history of the user, by causing the computing device to at least
            select a second layout order based at least in part on the activity history of the user; and
            generate a ranking of the first layout order and the second layout order; and
        provide the second layout order and the ranking of the first layout order and the second layout order to the provider application.

2. The system of claim 1, wherein the machine-readable instructions, when executed by the processor, further cause the computing device to at least:
 receive a user authentication request from a client device, wherein the user authentication request is redirected from the provider application to the computing device;
 authenticate the user of the client device; and
 issue the anonymized user identifier to the client device.

3. The system of claim 1, wherein the provider application is configured to cache the first layout order or the second layout order.

4. The system of claim 1, wherein the provider application is configured to organize the user interface based at least in part on the first layout order or the second layout order.

5. A method, comprising:
 receiving a request from a provider application, the request comprising an anonymized user identifier and a navigation identifier that identifies a location of a user associated with the anonymized user identifier within a user interface of the provider application;
 identifying the user associated with the anonymized user identifier;
 analyzing an activity history of the user to select a first layout order, wherein the first layout order is selected based at least in part on the navigation identifier and the activity history of the user by at least:
  selecting a second layout order based at least in part on the navigation identifier; and
  generating a ranking of the first layout order and the second layout order; and
 providing the second layout order and the ranking of the first layout order and the second layout order to the provider application.

6. The method of claim 5, further comprising:
 receiving a user authentication request from a client device, wherein the user authentication request is redirected from the provider application to the computing device;
 authenticating the user of the client device; and
 issuing the anonymized user identifier to the client device.

7. The method of claim 5, wherein the provider application is configured to cache the first layout order or the second layout order.

8. The method of claim 5, wherein the provider application is configured to organize the user interface based at least in part on the first layout order or the second layout order.

9. A non-transitory, computer-readable medium, comprising machine-readable instructions that, when executed by a processor of a computing device, cause the computing device to at least:
 receive a request from a provider application, the request comprising an anonymized user identifier and a navigation identifier that identifies a location of a user associated with the anonymized user identifier within a user interface of the provider application;
 identify the user associated with the anonymized user identifier;
 analyze an activity history of the user to select a first layout order, wherein the first layout order is selected based at least in part on the navigation identifier and the activity history of the user, by further causing the computing device to at least:
  select a second layout order based at least in part on a membership associated with the user; and
  generate a ranking of the first layout order and the second layout order; and
 provide the second layout order and the ranking of the first layout order and the second layout order to the provider application.

10. The non-transitory, computer-readable medium of claim 9, wherein the machine-readable instructions, when executed by the processor, further cause the computing device to at least:
 receive a user authentication request from a client device, wherein the user authentication request is redirected from the provider application to the computing device;
 authenticate the user of the client device; and
 issue the anonymized user identifier to the client device.

11. The non-transitory, computer-readable medium of claim 9, wherein the provider application is configured to organize the user interface based at least in part on the first layout order or the second layout order.

12. The non-transitory, computer-readable medium of claim 9, wherein the provider application is configured to organize the user interface based at least in part on the first layout order or the second layout order.

\* \* \* \* \*